No Printed Specification Available
9743X
A. Brooks.
Winding Bobbin.
Patented Jun. 20, 1836.
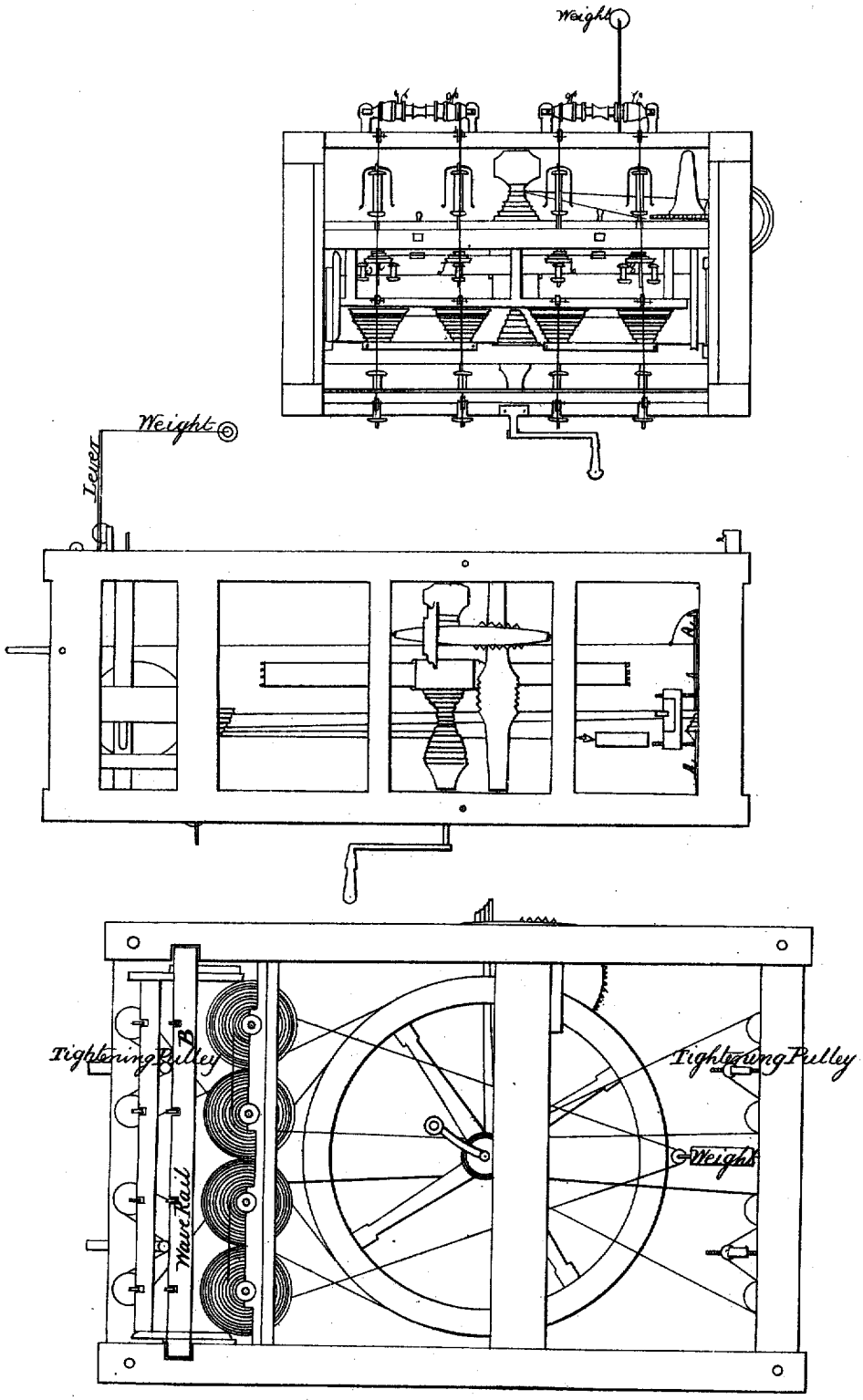
N. PETERS, PHOTO-LITHOGRAPHER, WASHINGTON, D. C.

See 455 for H.D

9743X

June 20 1836 — 447.

Adam Brooks 441

The schedule referred to in these Letters Patent and making part
of the same containing a description in the words of the said
Adam Brooks himself of his "improvements in the ma-
chine for [illegible] silk from the cocoons"
To all to whom these presents shall come. Be it
known that I Adam Brooks of Scituate in the Coun-
ty of Plymouth and State of Massachusetts have inven-
ted and made such a useful improvement in the Ma-
chine for spinning silk. for which Machine I have ob-
tained Letters Patent on the twenty ninth day of June
A.D. 1833. For such parts of which as I have made use
of in my last, reference to be had to the original draft
and models in the patent office at Washington —
And the following is a full and exact description of the
improvements on that Machine by me. A represents
the main rollers that must be covered with leaf wire
or brass fluted, or some metal, as iron will rust and black
the silk if used to spin the silk wet from the cocoons,
on the end of said roller is a screw, operating into a notch-
ed wheel upon the end of shaft B. upon the lower
end of which is a screw which carries notched wheel C.
which wheel is on the shaft E. and carries the heart mo-
tion D, D, which in revolving carries shaft E upon the
ends of which are pulleys that play upon the hearts marked
D and which move the rail marked F up and down,
thereby laying thread even upon the spool. Near the mid-
dle of said F is a rod, oplicating [illegible] which as the rail
F moves up and down traverses in an oblique motion
G which is connected with a [illegible] bar, in which
are guide wires to guide the thread as it is drawn between
the rollers. H a perpendicular rod from the upper
roller the lower end of which being [illegible] is confined
to to a plate and stop J. the object of which is to stop the two spindles on each side at pleasure, & is confined (and plays upon an axle fastened to the upper rail of the frame. The upper end of said rod crooks over the top roller and which roller is obliged to the same by a band to gudgeons at the ends of the rollers, and which operates to stop and thread said spindle instantly; or on the upper end of rod H. being made about two inches longer and have a rod fixed to it passing down to the bands, and be fixed either by being curled or having pulleys fixed so as that the handles I. or I. are moved forward and back, it will raise the band onto a loose whirl or pulley on the spindle to stop it and return the same onto the whirl to set it in motion again; or the same rod may be fixed to a loose whirl on the spindle that carries the chain by a check pin which rod will raise the whirl off and return it to regulate the spindle at pleasure, When either of the last described methods are adopted, then the lower part of rod H should be dispensed with by pulling the handles on rods I. or I. the roller can be raised and spindle stopped to perfect the thread, by either plan above mentioned, K.K.K.K. are small bars in the end of which are crooked wires to guide the thread over the head of the spools, V. V. are two bars passing through the upper rail in front, in the end of which are three curled wires which are placed in triangular form so that in doubling twist it will regularly unite the several parts into a cord, before it is twisted by the spindle below. D. is a third roller over which the thread passes and back between that and the next, (and) then forward between the two lower ones, (which is used in doubling sewing silk and twist, and causes a bearing thereby rendering thread even. The rod I. lying horizontally 9743X 419 tally is connected to the perpendicular axle marked I (and
is also used for stopping the threads at pleasure. R is a
tin or cast iron pan with partitions with holes through
them for the water to pass equally from one to the other. A.A.
are the parts of the pan for the cocoons while reeling; b.b. that
part of the pan in which to keep the cocoons, and to collect
the threads to supply when wanting. C.C. represents the doors of
the furnace which is to heat the water in the pans above,
and in which furnace there is a grate within about four
inches of the top, and in which furnace can be used wood or
or might be heated by conducting steam into the pans,
coal. O. is a pulley upon the end of the cylinder which
for common use out to be about four inches diameter, but
which may be varied as the twist of the thread requires:
M. is a standing pulley where power is designed to be applied,
N is a loose pulley to stop the machinery at pleasure.
P. is a bolt passing through the upper rail operating through
a spiral spring to hold the upper rollers down. Which may
be done by the same or a weight; the rings in bar H
I do not claim to have invented, but use them by purchase
of the patentee or his assigns, but I claim the applica-
tion of the spindles and rings to spin silk immediate-
ly as it comes from the cocoons. I have used them &
find they will bear the greatest speed of any now in
use. The above draft and model are designed to be en-
larged so as to carry any number of spindles that may
be wanted and which I have already increased to great
advantage, and water, steam or any other kind of
power can be applied to it Witnesses … Scituate April 4th month 19th 1831
Samuel A Greene — Adam Brooks
Silas S. Brooks

[illegible]
[1089 [illegible]